(12) United States Patent
Tokunaga et al.

(10) Patent No.: US 7,370,882 B2
(45) Date of Patent: May 13, 2008

(54) AIR BAG SYSTEM HAVING DIFFUSER STRUCTURE

(75) Inventors: Shinya Tokunaga, Seto (JP); Mitsuyoshi Ohno, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 419 days.

(21) Appl. No.: 10/484,496

(22) PCT Filed: Jul. 22, 2002

(86) PCT No.: PCT/IB02/02854

§ 371 (c)(1),
(2), (4) Date: Jun. 23, 2004

(87) PCT Pub. No.: WO03/010033

PCT Pub. Date: Feb. 6, 2003

(65) Prior Publication Data

US 2004/0232664 A1 Nov. 25, 2004

(30) Foreign Application Priority Data

Jul. 23, 2001 (JP) ............................. 2001-221849

(51) Int. Cl.
*B60R 21/16* (2006.01)
(52) U.S. Cl. .................................................. 280/730.2
(58) Field of Classification Search ............. 280/730.2, 280/742, 740
See application file for complete search history.

(56) References Cited

U.S. PATENT DOCUMENTS

| | | | |
|---|---|---|---|
| 5,788,270 A | 8/1998 | Haland et al. | |
| 6,103,984 A * | 8/2000 | Bowers et al. | 280/730.2 |
| 6,164,688 A | 12/2000 | Einsiedel et al. | |
| 6,234,516 B1 | 5/2001 | Boxey | |
| 6,237,941 B1 | 5/2001 | Bailey et al. | |
| 6,293,581 B1 * | 9/2001 | Saita et al. | 280/730.2 |
| 7,040,652 B2 * | 5/2006 | Ogata et al. | 280/730.2 |
| 7,059,629 B2 * | 6/2006 | Takahara | 280/730.2 |
| 2004/0104563 A1 * | 6/2004 | Fischer | 280/743.1 |

FOREIGN PATENT DOCUMENTS

| | | | |
|---|---|---|---|
| DE | 197 38 741 | | 9/1997 |
| DE | 201 05 734 | | 4/2001 |
| DE | 20105734 | * | 8/2001 |
| GB | 2 355 052 A | | 4/2001 |
| JP | U-3044475 | | 10/1997 |
| JP | 11-301394 | | 3/1999 |
| JP | 11-314555 | | 3/1999 |

(Continued)

*Primary Examiner*—Ruth Ilan
*Assistant Examiner*—Robert A. Coker
(74) *Attorney, Agent, or Firm*—Finnegan, Henderson, Farabow, Garrett & Dunner, L.L.P.

(57) ABSTRACT

An air bag system is provided in which an air bag stored in a folded state in a vehicle is adapted to be inflated by a gas supplied from an inflator through a diffuser so as to protect an occupant of the vehicle. In the air bag system, the diffuser is disposed on one side of the inflator such that the diffuser and the inflator are substantially aligned with each other, and the diffuser includes a gas feed portion that is exposed to a gas inlet formed in a generally middle portion of the air bag as viewed in a longitudinal direction thereof.

26 Claims, 15 Drawing Sheets

FOREIGN PATENT DOCUMENTS

| | | |
|---|---|---|
| JP | 2000-190807 | 12/1999 |
| JP | 2000-296753 | 10/2000 |
| JP | A-2000-296751 | 10/2000 |
| JP | A-2001-26249 | 1/2001 |
| JP | A-2002-37008 | 2/2002 |
| WO | WO 99/11493 | 3/1999 |

\* cited by examiner

F I G. 18
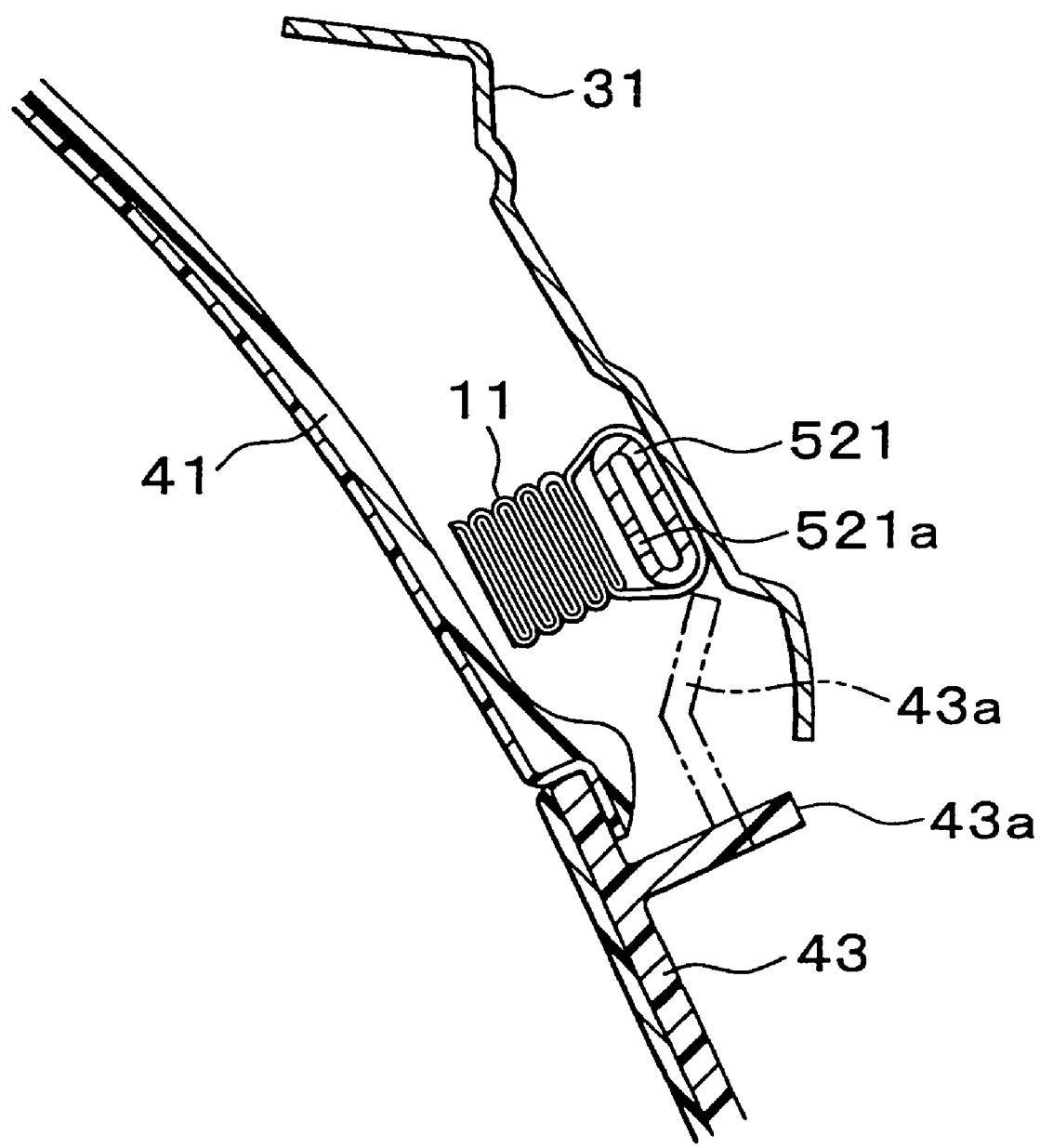

AIR BAG SYSTEM HAVING DIFFUSER STRUCTURE

BACKGROUND OF THE INVENTION

1. Field of Invention

The invention generally relates to an air bag system installed in a motor vehicle and a diffuser used in the air bag system, and more particularly to an air bag system in which an air bag, which is stored in a folded state in a certain portion of the vehicle, is adapted to deploy by using gas supplied from an inflator via a diffuser, in order to protect a vehicle occupant or occupants.

2. Description of Related Art

In a known air bag system of the above type as disclosed in, for example, Japanese Laid-Open Patent Publication No. 11-301394, a diffuser (connecting line) having a great length is disposed in front of an inflator so as to extend in a curved form in the longitudinal direction of the vehicle. The diffuser is inserted in the air bag through a gas inlet port formed in a longitudinally end portion (i.e., rear end portion) of the air bag. The inflator supplies a gas into the air bag via gas supply ports (a large number of gas outlets) formed in the diffuser.

The diffuser of the known air bag system as described above is located ahead of the front side of the inflator that is disposed rearwardly of the air bag. With this arrangement, while gas may be guided from the inflator into the air bag with high accuracy, it is difficult to guide the gas from the inflator to inflatable chambers formed in middle and front end portions of the air bag within a sufficiently short period of time, because of relatively long distances from the inflator to the middle portion and front end portion of the air bag. It is thus difficult to complete deployment of the air bag within a sufficiently short time.

Furthermore, the known diffuser having a large length may cause various problems, such as reduced handling ease at the time of, for example, loading into a plant or installation of the air bag system in the vehicle, increased cost and weight, and increased loss of space upon installation of the system on the vehicle. The cost of the diffuser may also be increased because multiple gas outlet ports are formed in the long diffuser in different cutting processes.

SUMMARY OF THE INVENTION

In view of the above problems, the invention provides an air bag system in which an air bag stored in a folded state in a vehicle is adapted to be inflated by a gas supplied from an inflator through a diffuser so as to protect an occupant of the vehicle, which air bag system is characterized in that (1) the diffuser is disposed on one side of the inflator such that the diffuser and the inflator are substantially aligned with each other, and (2) the diffuser includes a gas feed portion that is exposed to a gas inlet formed in a generally middle portion of the air bag as viewed in a longitudinal direction thereof.

With the air bag system constructed as described above, the gas inlet is provided in a longitudinally middle portion of the air bag, and the distance over which the gas travels from the inflator to the gas inlet of the air bag can be minimized. In addition, the distance from the gas inlet of the air bag to inflatable portions of the air bag can be advantageously reduced. With this arrangement, the flow resistance of the diffuser can be reduced, and gas can be guided to the inflatable portions as end portions of the air bag within a short time. Thus, the time required for completing deployment of the air bag can be advantageously shortened.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 14B is a cross-sectional view of the eighth modified example taken along a centerline extending in the longitudinal direction of the diffuser;

FIG. 18 is a vertical cross-sectional view showing a main part of a head-protection air bag system including the diffuser as shown in FIG. 17;

DETAILED DESCRIPTION OF PREFERRED EMBODIMENTS

Figure 1:
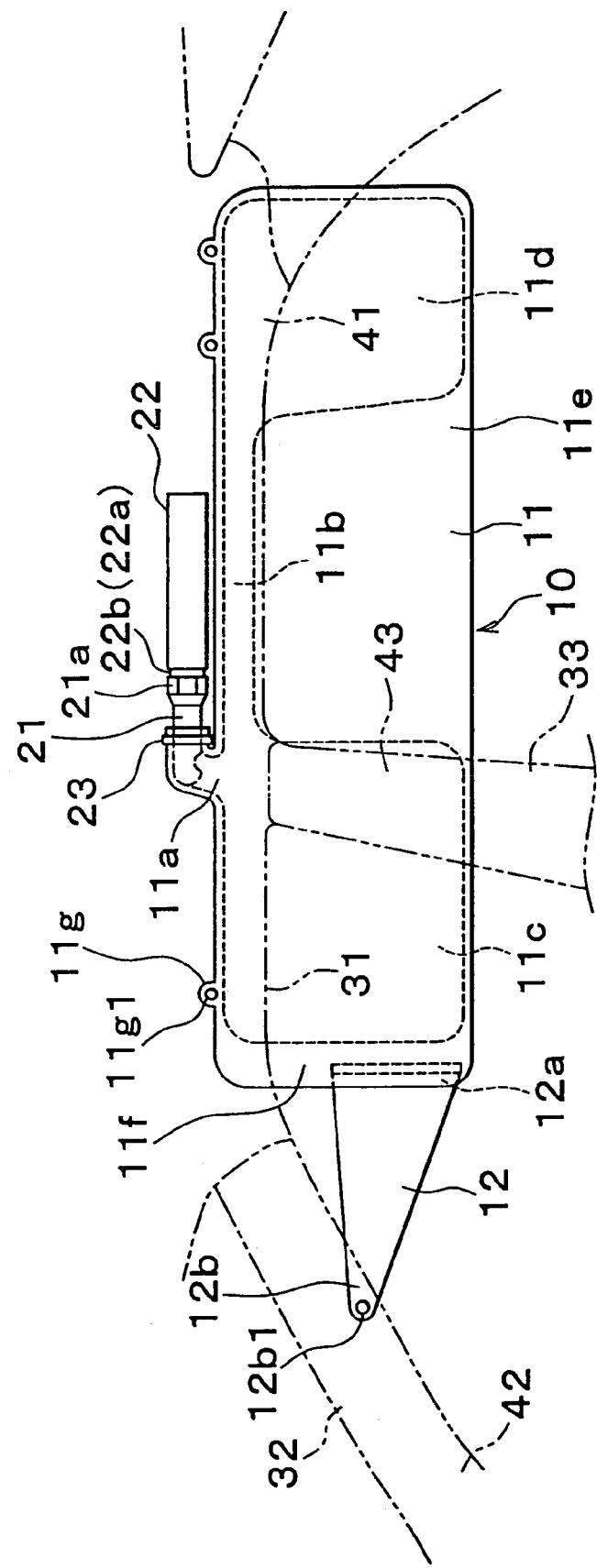
FIG. 1 is a side view showing a head-protection air bag system according to one exemplary embodiment of the invention.

Hereinafter, one exemplary embodiment of the invention will be described with reference to the accompanying figures. FIGS. 1 to 6 show a head-protection air bag system designed for passenger vehicles according to one embodiment of the invention. The head-protection air bag system of the embodiment includes an air bag 10 and an inflator 22. The air bag 10 is inflated into the shape of a curtain at a side region of a passenger compartment of the vehicle, thus protecting front-seat and rear-seat occupants (not shown) from head injury. The inflator 22 supplies the air bag 10 with gas via a diffuser 21. The air bag 10 includes an air bag body 11 and a tension cloth 12. The air bag body 11 has inflatable portions and non-inflatable portions. The tension cloth 12, which has no inflatable portion, is attached to a front-end portion of the air bag body 11.

The air bag body 11 is woven into the shape of a bag in such a manner that weave patterns extend in both longitudinal and vertical directions of the vehicle. A coating material for guaranteeing airtightness is applied to the surface of the air bag body 11. The air bag body 11 has a gas supply port 11a formed in a longitudinally middle portion of the air bag body 11, a gas passage 11b which extends in the longitudinal direction below the gas supply port 11a, and a front-seat inflatable portion 11c and a rear-seat inflatable portion 11d communicating with each other through the gas passage 11b. The air bag body 11 further has an intermediate non-inflatable portion 11e, a front-end non-inflatable portion 11f, and a plurality of mounting lobes 11g. Each of the mounting lobes 11g has a mounting hole 11g1, which enables the air bag body 11 to be mounted or attached to a roof side rail 31.

The tension cloth 12 has a triangular shape (which can be changed to another shape if necessary) and is made from a non-coated woven cloth (a base cloth with no inflatable portion), which is thinner and less expensive than a cloth constituting the air bag body 11. The tension cloth 12 is sewn at its rear-end portion 12a to the front-end non-inflatable portion 11f. A front-end portion 12b of the tension cloth 12 having a mounting hole 12b1 is attached to an A-pillar 32 (see FIG. 1).

Figure 2:
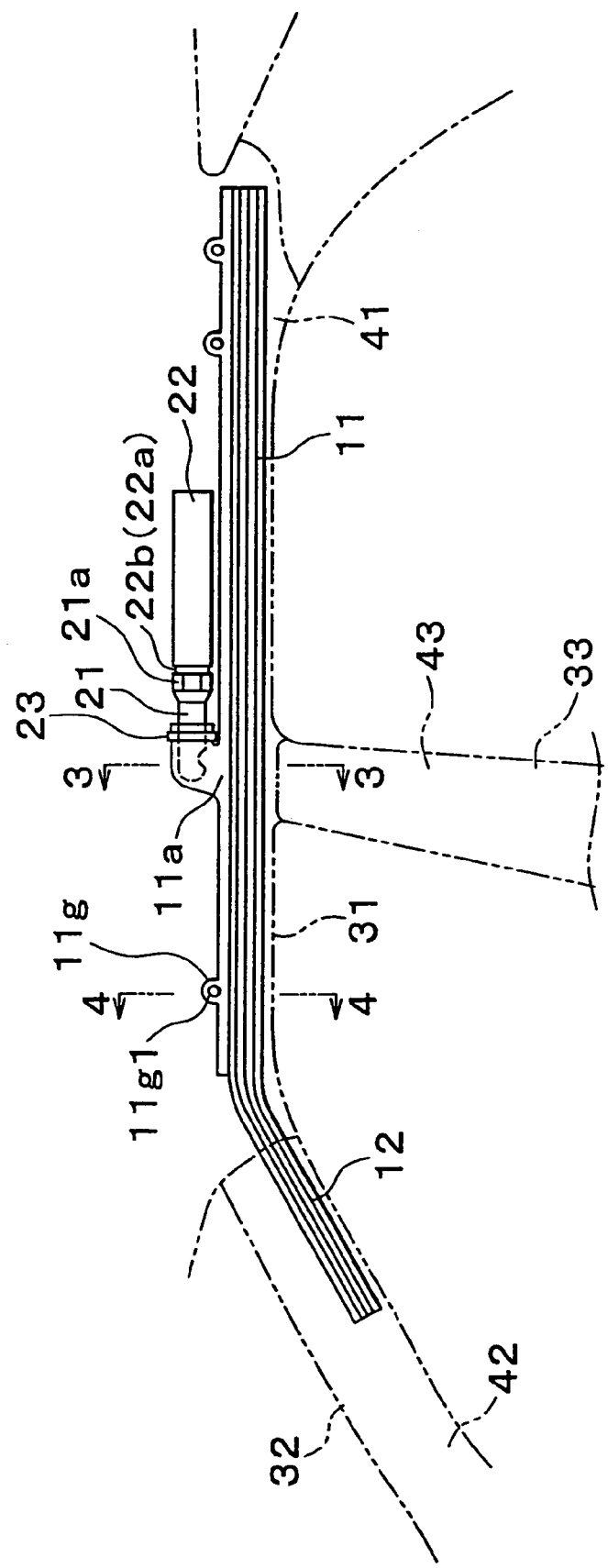
FIG. 2 is a side view showing the air bag system of FIG. 1 in which an air bag is stored in a predetermined portion of the vehicle.
Figure 3:
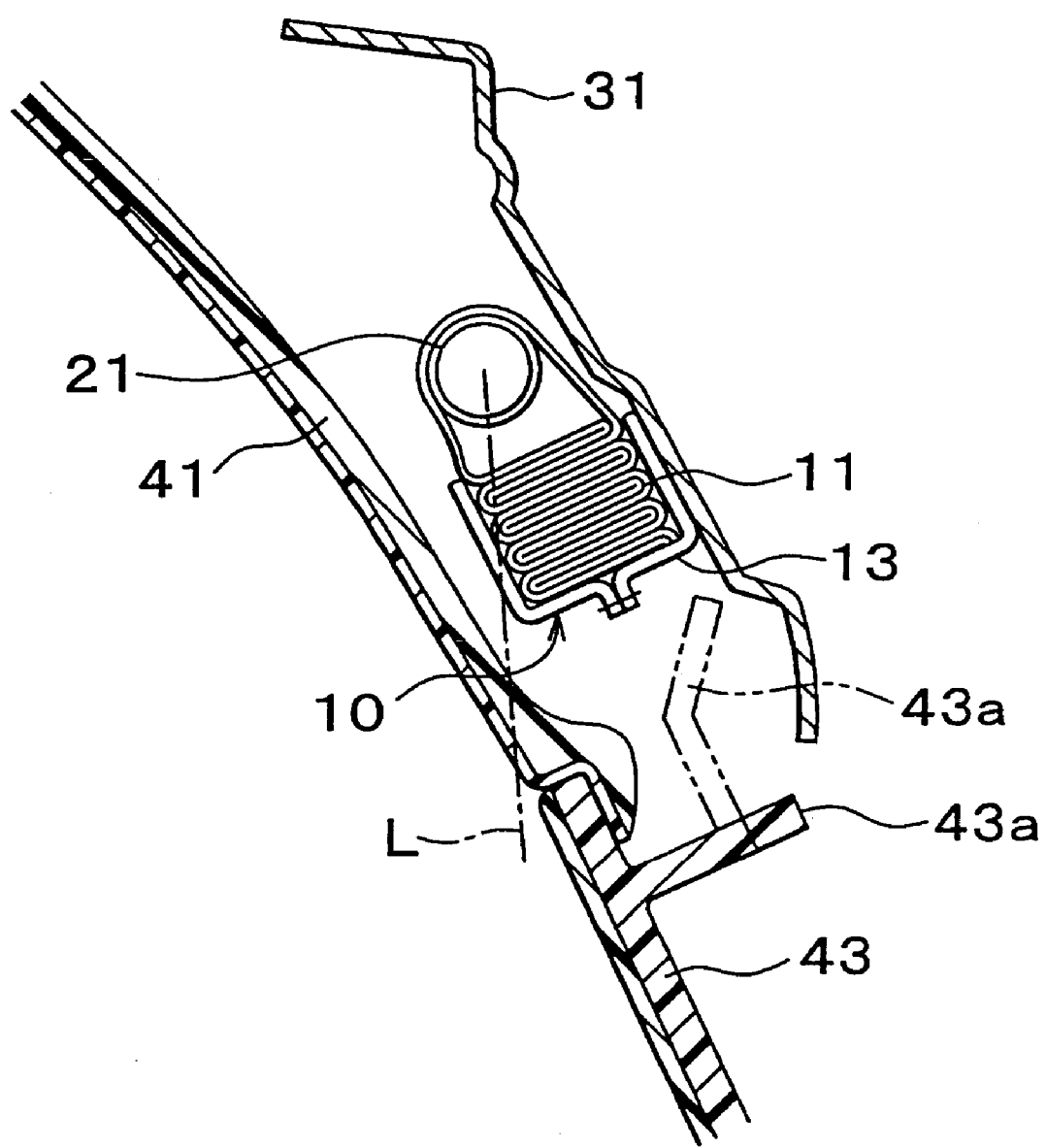
FIG. 3 is an enlarged sectional view taken along line 3-3 of FIG. 2.
Figure 4:
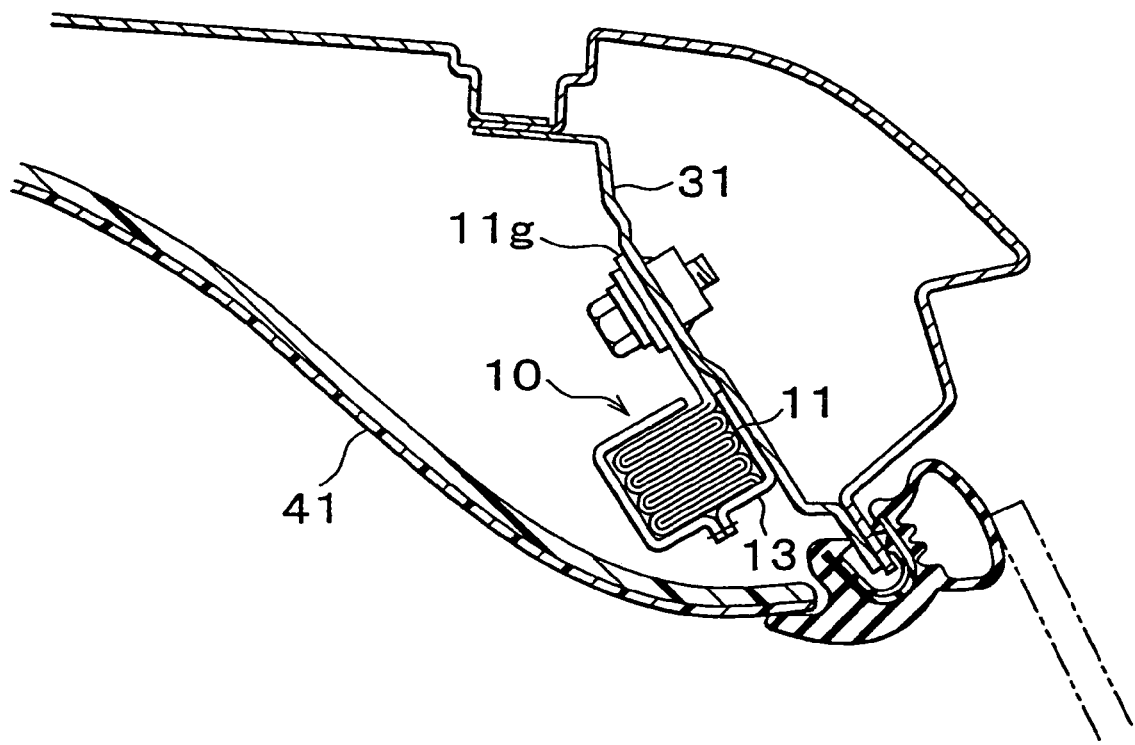
FIG. 4 is an enlarged sectional view taken along line 4-4 of FIG. 2.

As shown in FIGS. 2 to 4, the air bag body 11 is folded in the vertical direction into the shape of bellows, and is stored in this folded state along a roof side rail 31 in a space formed between the roof side rail 31 and a side edge portion of a roof head lining 41. As shown in FIG. 2, the tension cloth 12, which has also been folded in the shape of bellows, is stored along an A-pillar 32 in a space formed between the A-pillar 32 and an A-pillar garnish 42 attached to the A-pillar 32 to cover it. The air bag body 11 and the tension cloth 12, which have been folded into the shape of bellows, are retained or held by socks 13 (as shown in FIG. 3 and FIG. 4), which are ruptured when the air bag 10 is inflated.

As shown in FIGS. 1 to 3, FIG. 5 and FIG. 6, the diffuser 21 is formed in the shape of a cylinder closed at one end thereof and extends substantially straight in the longitudinal direction. The diffuser 21 is airtightly connected at one end to the inflator 22 in a substantially coaxial relationship by engaging a female screw portion or internally threaded portion (or nut portion) 21a formed at a proximal end (or rear end) of the diffuser 21 with a male screw portion or externally threaded portion 22b formed at a gas outlet 22a of the inflator 22. The diffuser 21 is also airtightly connected at the other end to the gas supply port 11a of the air bag body 11 using a fastening band 23.

Figure 5:
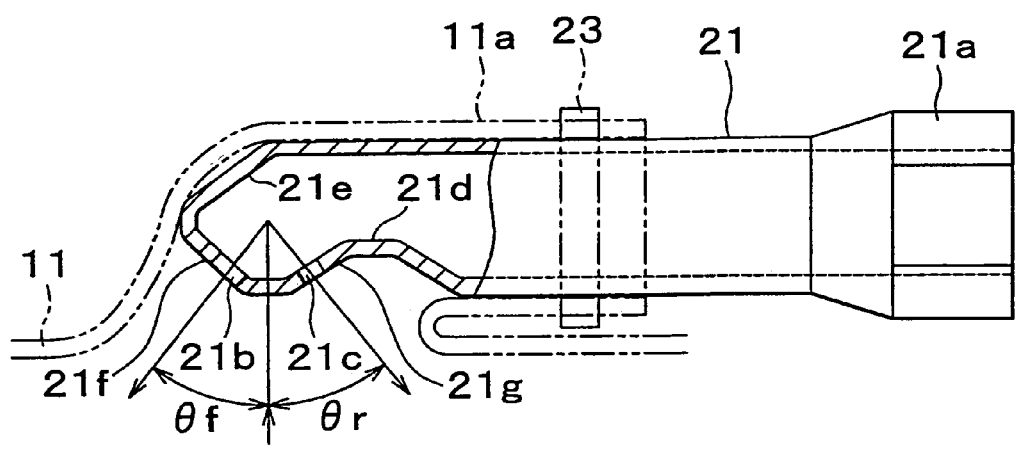
FIG. 5 is a partially cross-sectional, enlarged side view showing the diffuser as shown in FIGS. 1 and 2.
Figure 6:
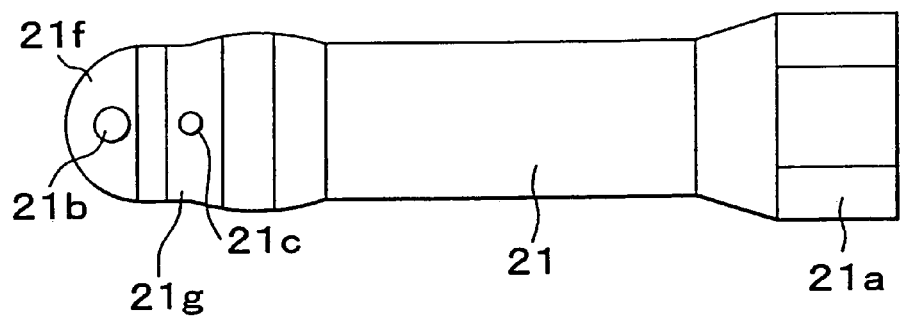
FIG. 6 is a bottom view of the diffuser as shown in FIG. 5.

As shown in FIGS. 5 and 6, the diffuser 21 includes front and rear gas feed holes 21b, 21c formed in the lower wall of the front-end portion of the diffuser 21 which faces the gas supply port 11a of the air bag body 11. The front gas feed hole 21b has a relatively large size, and the rear gas feed hole 21c has a relatively small size. A gas flow control portion 21d is formed on one side (i.e., rear side) of the gas feed holes 21b, 21c closer to the inflator 22, and an inclined face 21e is formed on the other side (i.e., front side) of the gas feed holes 21b, 21c.

The front gas feed hole 21b is formed in an inclined wall 21f of the diffuser 21 which faces forward as viewed in the running direction of the vehicle. The front gas feed hole 21b allows a gas passing therethrough to be ejected in a forward and downward direction at a predetermined angle θ. The predetermined angle θ is set such that the gas flow indicated by an arrow in FIG. 5 does not interfere with a front portion of the base cloth that defines the gas supply port 11a of the air bag body 11. On the other hand, the rear gas feed hole 21c is formed in an inclined wall 21g of the diffuser 21 which faces rearward. The rear gas feed hole 21c has a smaller diameter than that of the front gas feed hole 21b, and allows a gas to be ejected in a rearward and downward direction at a predetermined angle θr. The predetermined angle θr is set such that the gas flow indicated by an arrow in FIG. 5 does not interfere with a rear portion of the base cloth that defines the gas supply port 11a of the air bag body 11.

As shown in FIG. 5, the gas flow control portion 21d protrudes a predetermined amount into the inside of the diffuser 21. Namely, the gas flow control portion 21 has an inclined surface at one side closer to the inflator 22 and an inclined surface at the other side closer to the front or distal end portion of the diffuser 21, and is thus formed in a generally wedge-like shape. The inclined face 21e is formed as part of the inner surface of the front end portion of the diffuser 21. The inclined face 21e functions to reflect a gas emitted substantially straight from the inflator 22, toward the gas feed holes 21b and 21c.

The inflator 22 ejects or supplies gas into the air bag body 11 in the case of a side collision, rollover, or the like, of the vehicle. The inflator 22 is fixed to the roof side rail 31 by means of a bracket and a bolt (not shown). The inflator 22 is disposed in the longitudinally middle portion of the vehicle to extend in the longitudinal or running direction of the vehicle along the roof side rail 31 above the air bag body 11, such that the inflator 22 is covered by the roof head lining 41.

In the air bag system of the embodiment constructed as described above, the air bag body 11 and the tension cloth 12, which are folded multiple times in the vertical direction and received in a compact size within the rupturable sock 13 (as shown in FIG. 3 and FIG. 4), are normally stored along the roof side rail 31 and the A-pillar 32 while being covered with the roof head lining 41 and the A-pillar garnish 42, respectively, as shown in FIG. 2.

In the air bag system of the embodiment, the diffuser 21 is disposed to extend in a substantially horizontal direction above a B-pillar 33 and a B-pillar garnish 43 that is mounted to the B-pillar 33 to cover it, as shown in FIG. 1 to FIG. 3. When the inflator 22 is mounted to the roof side rail 31, the positions of the gas feed holes 21b, 21c are determined such that the centerline L (as shown in FIG. 3) of the flow of gas from the gas feed holes 21b, 21c of the diffuser 21 into the air bag body 11 lies on the inner side of the passenger compartment relative to the upper end of the B-pillar garnish 43.

Further, a projection 43a is formed on the upper, back face of the B-pillar garnish 43, as shown in FIG. 3. The projection 43a serves to prevent the air bag body 11 from entering behind the B-pillar garnish 43 while being inflated and deployed. The projection 43a may be formed as indicated by the imaginary line in FIG. 3 such that an inclined surface is formed at an upwardly bent portion of the projection 43a.

With such arrangement, the deployment of the air bag body 11 is guided by the flow of the gas from the gas feed holes 23b, 23c into the air bag body 11 and the inclined surface of the projection 43a, so that the air bag body 11 is prevented from being trapped by the upper end portion of the B-pillar garnish 43.

In the embodiment constructed as described above, when a sensor (not shown) detects an acceleration equal to or higher than a set value in the case of an emergency, such as a side collision or a rollover of the vehicle, the inflator 22 supplies gas through the diffuser 21 into the gas supply port 11a of the air bag body 11 of the air bag 10 stored in a folded state. The supplied gas then inflates the front-seat inflatable portion 11c and the rear-seat inflatable portion 11d of the air bag body 11, thus deploying the air bag 10 as shown in FIG. 1. The entire body of the air bag 10 is eventually inflated into the shape of a curtain in the side region of the passenger compartment, thus protecting the front-seat and rear-seat occupants from bead injury.

The diffuser 21 used in this embodiment has a small length (which is equivalent to the width of the upper end portion of the B-pillar garnish 43), and has a substantially straight shape. It is therefore possible to minimize the distance along which gas is guided from the inflator 22 into the gas supply port 11a formed in the longitudinally middle portion of the air bag body 11, and is also possible to reduce the distance from the gas supply port 11a of the air bag body 11 to the inflatable portions 11c, 11d of the air bag body 11.

With the above arrangement, the flow resistance of the diffuser 21 can be reduced, and gas can be guided to the end portions of the inflatable portions 11c, 11d of the air bag body 11 within a short time. Thus, the time required for completing deployment of the air bag 10 can be shortened as compared with, for example, the case where an inflator is disposed rearwardly of the rear end of an air bag and gas is supplied from the inflator to inflatable portions of the air bag through a diffuser.

Further, in the present embodiment, the inflator 22 and the diffuser 21 are substantially aligned with each other in the longitudinal direction of the air bag body 11 stored in the folded state (i.e., in the running direction of the vehicle). Therefore, even if only a small space is available for storage of the air bag system, the air bag system can be favorably installed on the vehicle. In addition, since the diffuser 21 is formed in a substantially cylindrical shape having substantially the same axis as that of the inflator 22, the space efficiency is enhanced, and the diffuser 21 can be easily coupled to the gas supply port 11a of the air bag body 11 using a fastening device such as the fastening band 23.

Also, in the embodiment, the gas feed holes 21b, 21c serving as a gas feed portion of the diffuser 21 are concentrated in the front or distal end portion of the diffuser 21 which is remote from the inflator 22. This arrangement makes it possible to diffuse gas intensively in a moment at the front end portion of the diffuser 21. Thus, the flow from the diffuser 21 into the air bag body 11 can be made uniform or constant, as compared with the case where gas feed holes are provided in the diffuser at different locations along its entire length, thus assuring improved deployment performance of the air bag 10.

Also, since the gas feed holes 21b, 21c are formed in the cylindrical wall that extends in the longitudinal direction of the diffuser 21 in the embodiment, the gas can be diffused or dispersed from an elongate region of the diffuser 21 that extends in its longitudinal direction. With this arrangement, the gas is prevented from directly hitting a portion of the air bag body 11 in the vicinity of the diffuser 21, thus assuring a sufficient improved efficiency in diffusing the gas into the air bag 10.

Also, in the embodiment in which the gas feed holes 21b, 21c are provided as the gas feed portion of the diffuser 21, the gas feed portion can be easily formed in the diffuser 21, and therefore the diffuser 21 can be produced at relatively low cost. Meanwhile, the diffuser 21 of the embodiment is first formed by forging into a cylindrical shape (like a cap) closed at its front end portion. Then, the gas flow control portion 21, the inclined face 21e, and the inclined walls 21f and 21g are formed by press (i.e., bent and pressed), and the front and rear gas feed holes 21b, 21c are formed in the cylindrical wall of the diffuser 21.

As described above, an improved gas diffusing effect is provided in the embodiment in which the front and rear gas feed holes 21b, 21c are provided as the gas feeding portions of the diffuser 21. Furthermore, since the opening area of the front gas feed hole 21b is larger than that of the rear gas feed hole 21c, a large amount of gas can be supplied to the front-seat inflatable portion 11c having a larger capacity. This arrangement makes it possible to quickly inflate and deploy a region of the air bag 10 corresponding to the front-seat inflatable portion 11c (or to inflate and deploy the front-seat inflatable portion 11c and the rear-seat inflatable portion 11d substantially at the same time). Thus, the manner of deploying the air bag 10 can be easily controlled by suitably designing the gas feed holes 21b, 21c.

Also, in the embodiment, the cylindrical wall of the diffuser 21 is formed with the gas flow control portion 21d that protrudes into the inside of the diffuser 21. With this arrangement, the flow of the gas within the diffuser 21 can be controlled with a compact structure (having a portion protruding into the diffuser 21). Furthermore, since the gas flow control portion 21d is formed on one side of the gas feed holes 21b, 21c closer to the inflator 22, gas can be diffused at wide angles at the gas feed portion (gas feed holes 21b, 21c) after the gas flow is damped by the gas flow control portion 21d. Conversely, when gas flows fast or intensively, the gas flows substantially along a straight line, and it is therefore difficult to diffuse gas at wide angles.

Also, in the embodiment, the inclined face 21e is formed as part of the inner surface of the front end potion of the diffuser 21. The inclined face 21e serves to reflect gas ejected substantially straight from the inflator, toward the gas feed holes 21b and 21c. Thus, downward components can be effectively added to the flow of gas passing through the gas feed holes 21b, 21c, thus allowing the gas flowing from the diffuser 21 to the air bag body 11 to be effectively diffused.

Also, in the embodiment, the positions of the gas feed holes 21b, 21c are determined such that the flow of gas ejected from the diffuser 21 into the air bag body 11 does not interfere with a portion of the air bag body 11 defining the gas supply port 11a. Thus, the air bag is less likely to be damaged by the flow of gas ejected from the diffuser 21 into the air bag body 11, resulting in reduced damages to the air bag.

Also, in the embodiment, the positions of the gas feed holes 21b, 21c are determined such that the centerline L (as shown in FIG. 3) of the flow of gas from the gas feed holes 21b, 21c of the diffuser 21 into the air bag body 11 lies on the inner side of the passenger compartment relative to the upper end of the B-pillar garnish 43. With this arrangement, the air bag 10 deploys toward the inner side of the passenger compartment relative to the upper end of the B-pillar garnish 43, and is thus prevented from being trapped or caught by the upper end of the B-pillar garnish 43.

Figure 7:
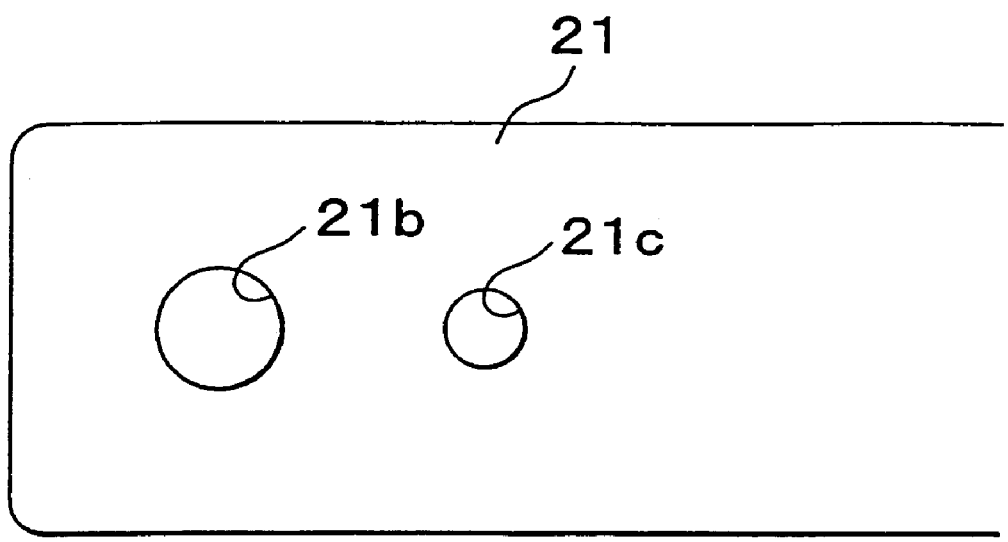
FIG. 7 is a bottom view showing a first modified example of the diffuser as shown in FIGS. 5 and 6.

While the air bag body 11 is woven into the shape of a bag in the illustrated embodiment, the air bag body 11 may be sewn into the shape of a bag, or may be formed into the shape of a bag by bonding (or thermal bonding). Furthermore, while the front gas feed hole 21b is formed in the inclined wall 21f facing forward and the rear gas feed hole 21c is formed in the inclined wall 21g facing rearward in the embodiment as shown in FIG. 5, the front gas feed holes 21b, 21c may be formed in a flat wall as shown in FIG. 7. In this case, the cost of the diffuser 21 can be further reduced.

Figure 8:
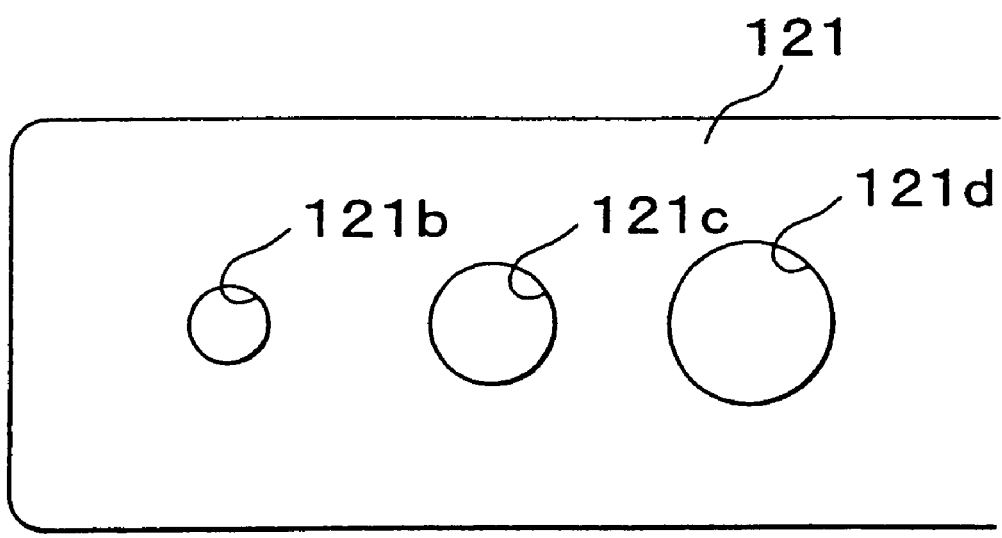
FIG. 8 is a bottom view showing a second modified example of the diffuser as shown in FIGS. 5 and 6.
Figure 9:
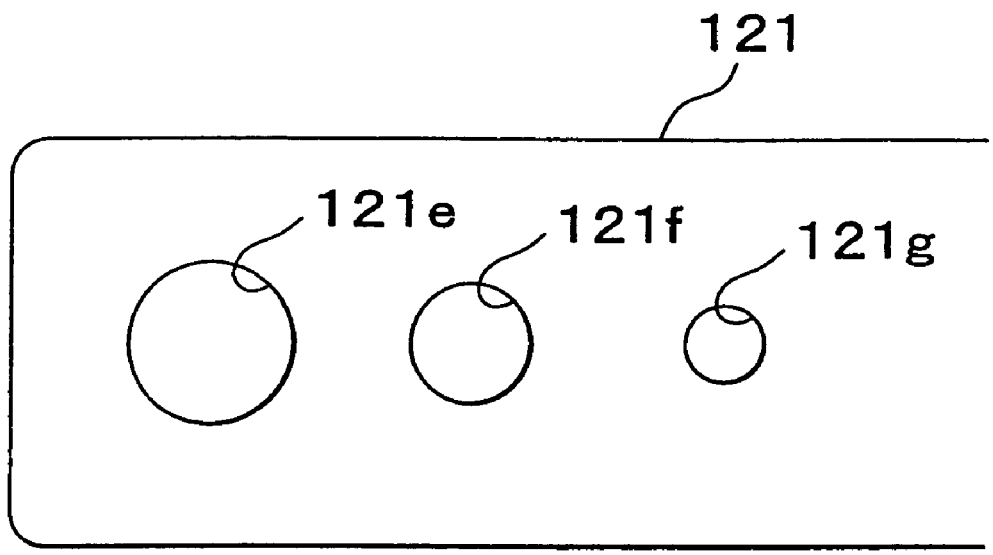
FIG. 9 is a bottom view showing a third modified example of the diffuser as shown in FIGS. 5 and 6.
Figure 10:
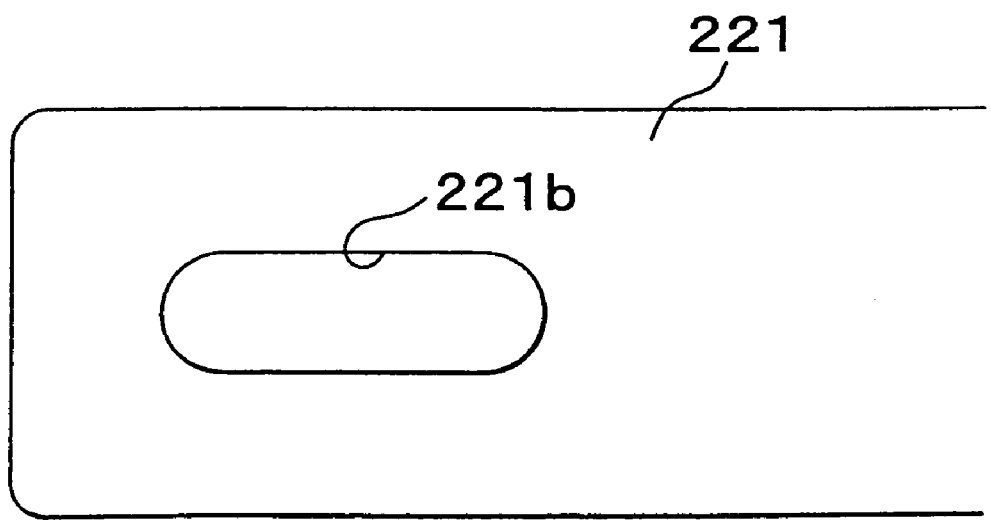
FIG. 10 is a bottom view showing a fourth modified example of the diffuser as shown in FIGS. 5 and 6.

Also, while the two gas feed holes (front and rear gas feed holes) 21b, 21c are provided as the gas feed portion of the diffuser 21 in the illustrated embodiment, three gas feed holes 121b, 121c and 121d (or 121e, 121f and 121g) may be provided as shown in FIG. 8 and FIG. 9. In FIG. 8, small, middle, and large gas feed holes, 121b, 121c, and 121d, are arranged in a direction from the front end potion of the diffuser 21 toward the inflator 22. In FIG. 9, on the other hand, large, middle, small gas feed holes 121e, 121f, and 121g are arranged in a direction from the front end portion of the diffuser 21 toward the inflator 22.

In the modified examples as shown in FIGS. 8 and 9, the gas diffusing effect can be further improved. Further, the opening areas of the gas feed holes 121b, 121c and 121d (or 121e, 121f, and 121g) are progressively changed along the longitudinal direction of the diffuser 121. Thus, a large amount of gas can be supplied through a portion of the diffuser 121 in which the opening area of the gas feeding hole 121d or 121e is large, thereby enabling quick deployment of a corresponding portion of the air bag. In this manner, the deployment of the air bag can be easily controlled.

Figure 11:
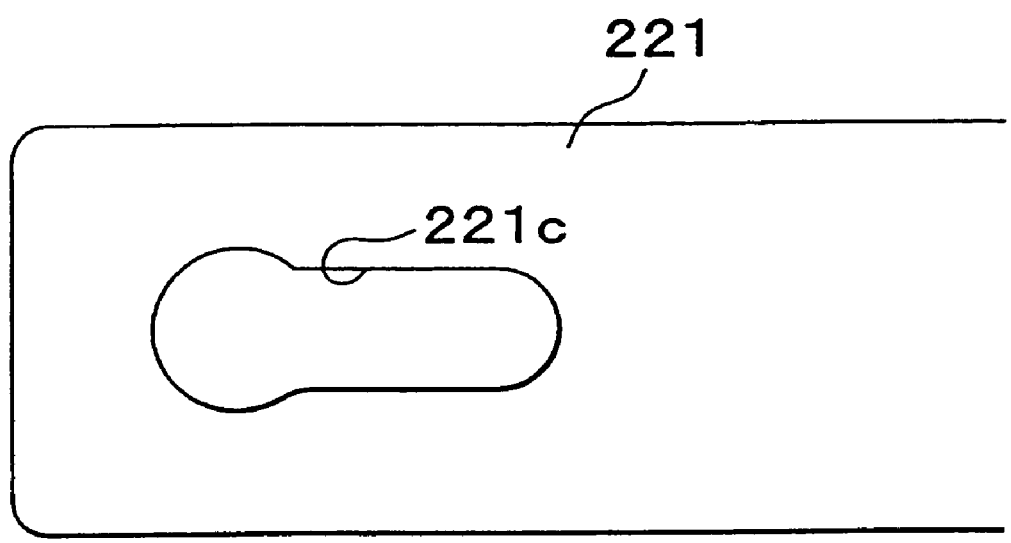
FIG. 11 is a bottom view showing a fifth modified example of the diffuser as shown in FIGS. 5 and 6.
Figure 12:
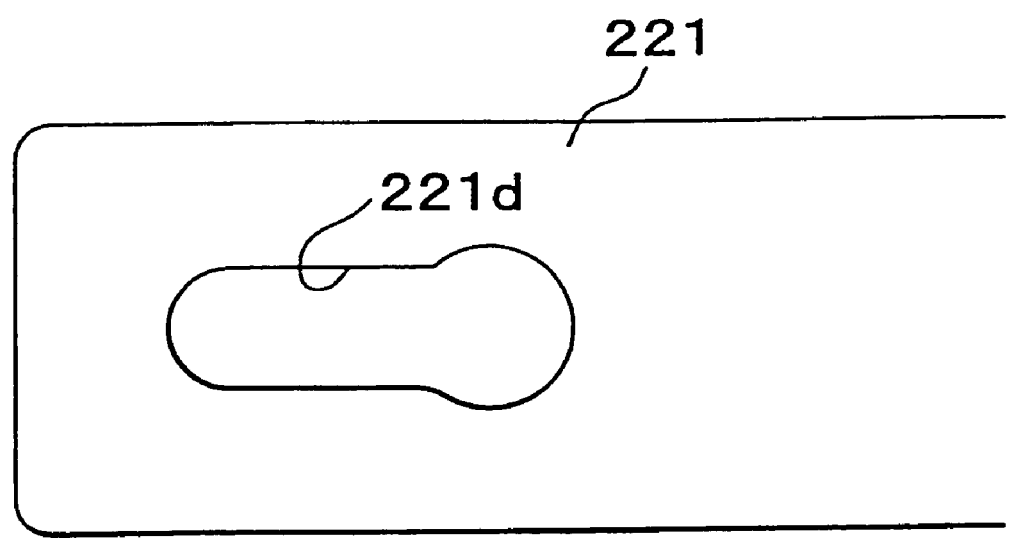
FIG. 12 is a bottom view showing a sixth modified example of the diffuser as shown in FIGS. 5 and 6.

Also, while the gas feed holes 21b, 21c having a circular shape are provided as the gas feed portion of the diffuser 21, an oblong gas feed hole 221b or 221c or 221d, which extends in the longitudinal direction of the diffuser 221, may be alternatively provided as shown in FIG. 11, FIG. 12 or FIG. 13. The oblong gas feed hole 221b permits continuous diffusion of gas in the longitudinal direction of the diffuser 221. The oblong gas feed hole 221c or 221d as shown in FIG. 11 or FIG. 12 includes a longitudinally end portion having a larger width (as measured in a direction perpendicular to the longitudinal direction) than the other portion. With the hole 221c or 221d thus shaped, it is possible to quickly inflate and deploy a portion of the air bag corresponding to the longitudinally end portion of the oblong gas feed hole 221c or 221d having the larger width. In this manner, the deployment of the air bag can be easily controlled.

Figure 13A:
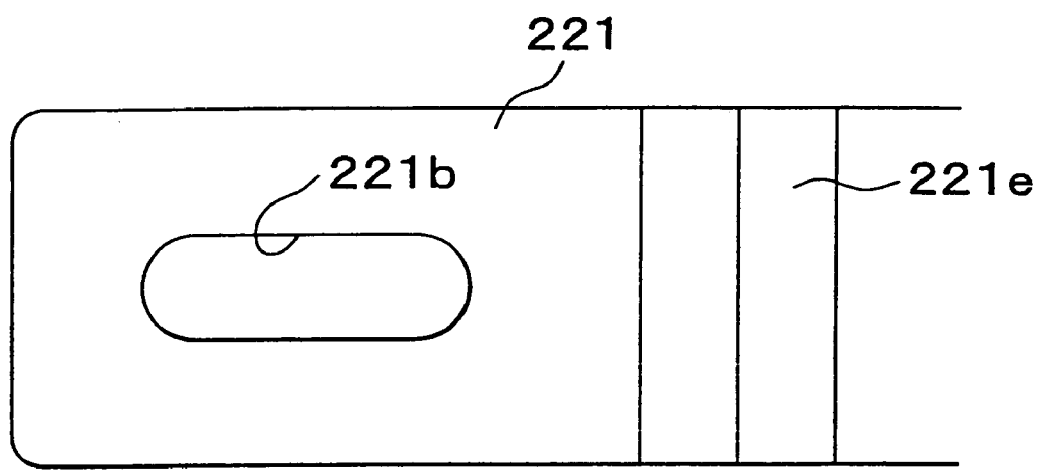
FIG. 13A is a bottom view showing a seventh modified example of the diffuser as shown in FIGS. 5 and 6.
Figure 13B:
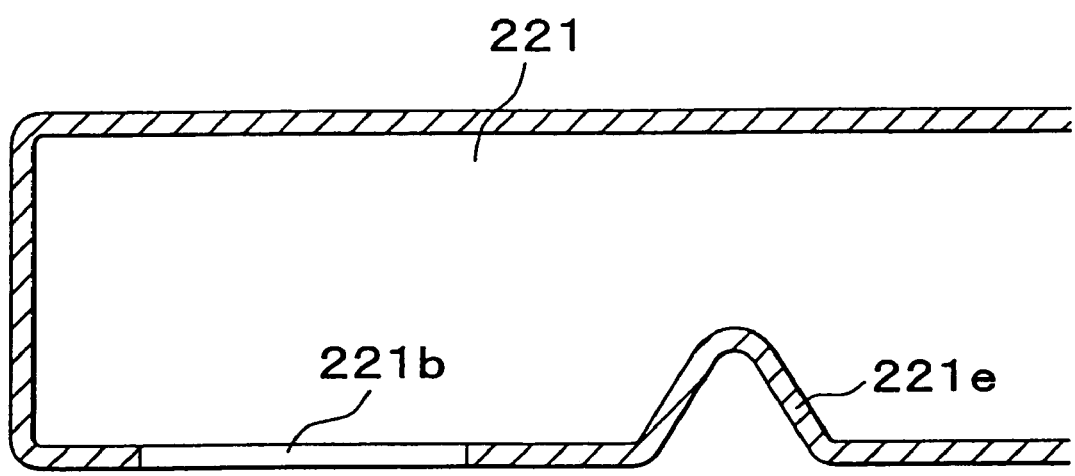
FIG. 13B is a cross-sectional view of the seventh modified example taken along a centerline extending in the longitudinal direction of the diffuser.

FIGS. 13A and 13B illustrate a further modified example in which a gas flow control portion 221e is provided on one side of an oblong gas feed hole 221b of the diffuser 221 closer to the inflator 22. In this modified example, too, substantially the same effects and advantages as provided by the gas flow control portion 21d in the embodiment of FIG. 1 to 6 can be obtained. FIG. 13A is a bottom view of the front or distal end portion of the diffuser 221, and FIG. 13B shows a sectional side view of the front end portion of the diffuser 221, taken along the one-dot chain line (i.e., centerline) as indicated in FIG. 13A.

Figure 14A:
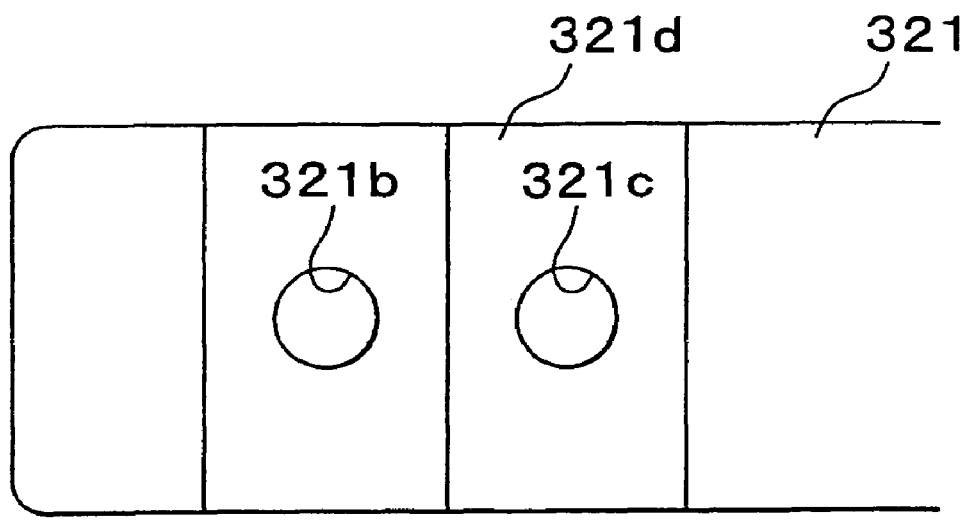
FIGS. 14A and 14B is a bottom view showing an eighth modified example of the diffuser as shown in FIGS. 5 and 6.
Figure 14B:
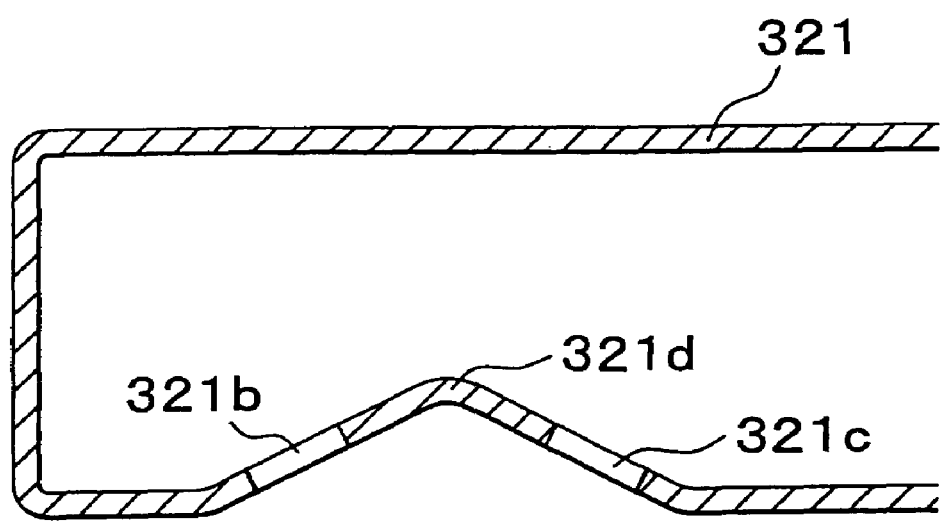
Figure 15:
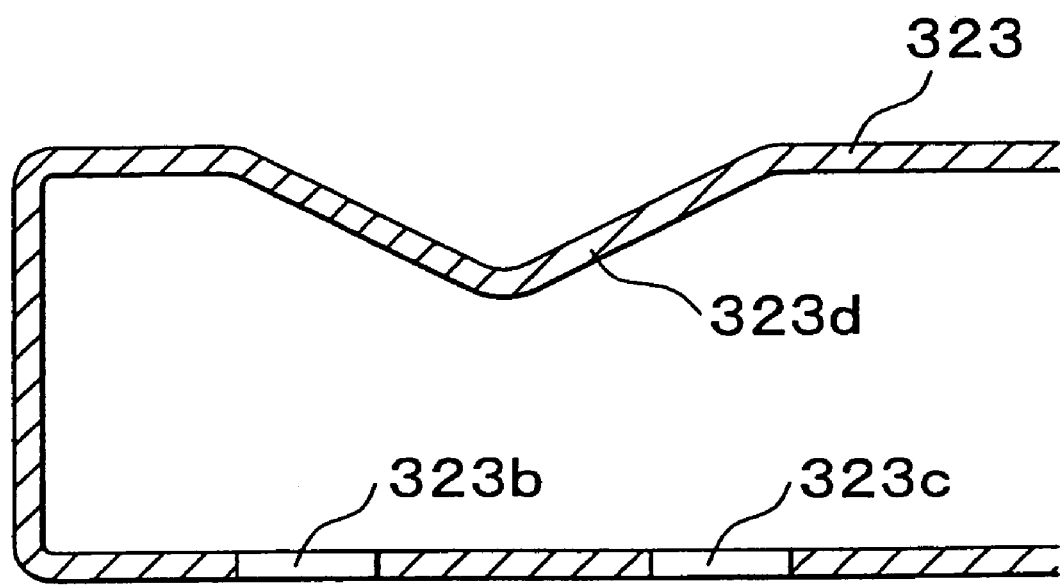
FIG. 15 is a sectional view showing a ninth modified example of the diffuser as shown in FIGS. 5 and 6.

In the embodiment of FIGS. 1 to 6, the gas feeding holes 21b, 21c and the gas flow control portion 21d are provided separately from each other to be arranged in series in the longitudinal direction of the diffuser 21. In a modified example as shown in FIGS. 14A and 14B, gas feed holes 321b, 321c and a gas flow control portion 321d are provided at the same location in a diffuser 321. In another modified example as shown in FIG. 15, gas feed holes 323b, 323c are formed through the bottom wall of a diffuser 323 while a gas flow control portion 323d is formed at the top wall such that the gas feed holes 323b, 323c and the gas flow control portion 323d face each other in the vertical direction of the diffuser 323. In the modified examples as shown in FIGS. 14A, 14B and FIG. 15, the length of the diffuser 321, 323 can be advantageously reduced while at the same time permitting control of the gas flow through the use of the gas feed holes and the gas flow control portion. FIG. 14A is a bottom view of the front or distal end portion of the diffuser 323, and FIG. 14B is a sectional side view of the front end portion of the diffuser 321, taken along the one-dot chain line (i.e., centerline) as indicated in FIG. 14A.

Further, in the modified example of FIG. 15, the gas flow that has been controlled by the gas flow control portion 323b can be directly guided to the gas feed holes 323b, 323c, resulting in effective diffusion of the gas into the air bag. Moreover, the gas flow control portion 323b as shown in FIG. 15 is shaped like a wedge, namely, has an inclined surface on one side closer to the inflator 22 and another inclined surface on the other side closer to the front end portion of the diffuser 323. Thus, the gas flow can be surely divided or diffused in two directions at the gas flow control portion 323b shaped like a wedge.

Figure 16A:
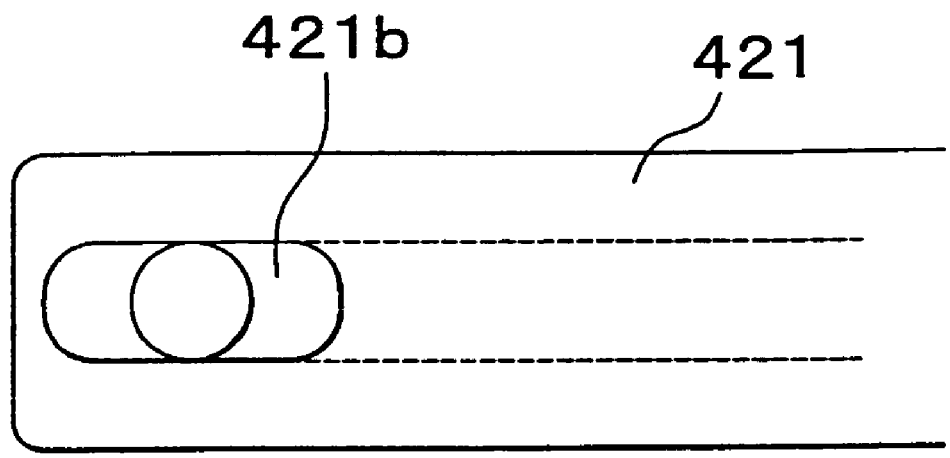
FIG. 16A is a bottom view showing a tenth modified example of the diffuser as shown in FIGS. 5 and 6.
Figure 16B:
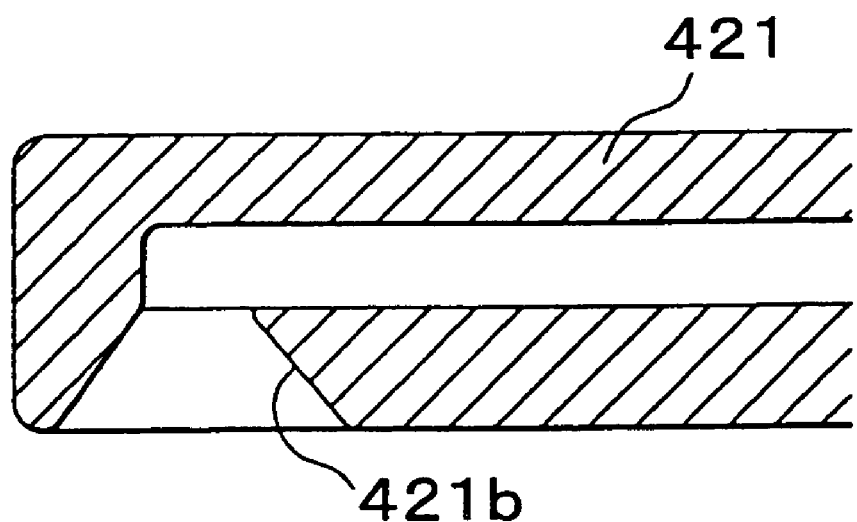
FIG. 16B is a cross-sectional view of the tenth modified example taken along a centerline extending in the longitudinal direction of the diffuser.

In the embodiment of FIGS. 1 to 6, the diffuser 21 has a relatively small wall thickness, and the gas feed holes 21b, 21c are defined by straight (or upright) walls of the diffuser 21. FIGS. 16A and 16B show another modified example in which a diffuser 421 has a relatively large wall thickness, and the gas feed hole 421b is tapered such that its longitudinal dimension increases in a direction from the inside to the outside of the diffuser 421. By suitably setting the dimensions of the tapered gas feed hole 421b, an angle of diffusion of the gas from the diffuser 421 into the air bag as measured in the longitudinal direction can be set as desired. FIG. 16A is a bottom view of the front or distal end portion of the diffuser 421, and FIG. 16B is a sectional side view of the front end portion of the diffuser 421, taken along a centerline that extends in the longitudinal direction of the diffuser 421.

Figure 17A:
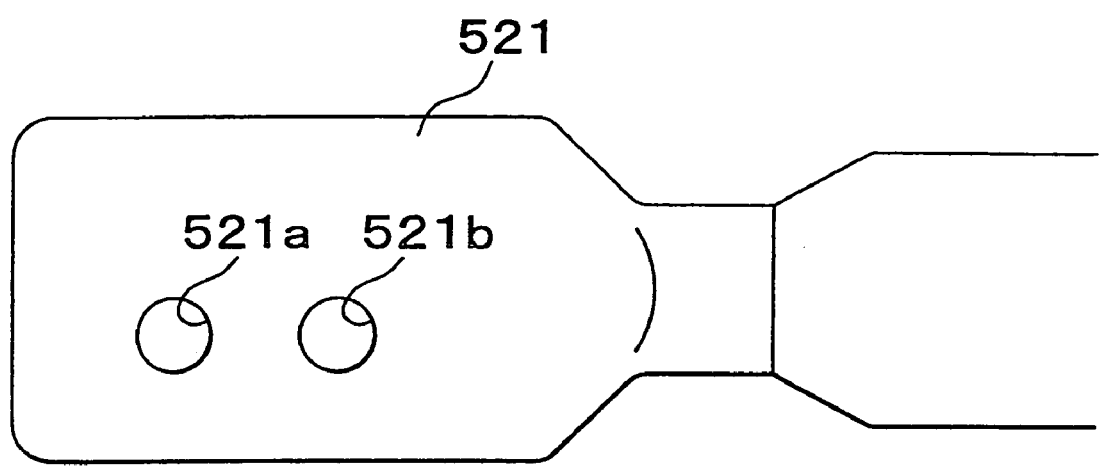
FIG. 17A and FIG. 17B are side view and front elevational view, respectively, showing an eleventh modified example of the diffuser as shown in FIGS. 5 and 6.
Figure 17B:
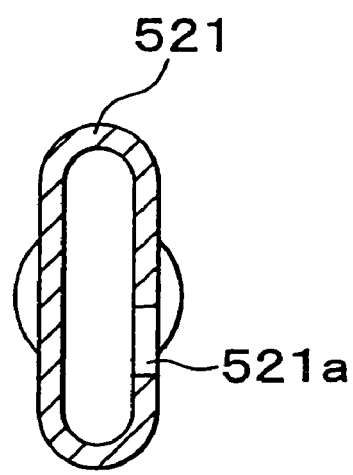

While the diffuser 21 has a substantially cylindrical shape in the embodiment of FIG. 1 to 6, the shape of the diffuser may be changed. For example, a portion of a diffuser 521 in which gas feed holes 521a, 521b are provided is formed in a substantially flat shape, as shown in FIGS. 17A and 17B. Namely, the diffuser 521 includes a front or distal end portion having opposite flat surfaces and defining an elongate bore. In this modified example as shown in FIGS. 17A and 17B, the diffuser 521 can be easily installed even in a portion of the vehicle in which the installation space is considerably limited if the diffuser 521 is formed in a flat shape so as to conform to the limited installation space. FIG. 17A shows a side face of the diffuser 521, and FIG. 17B is a front view showing a cross section of a portion of the diffuser 521 in which the gas feed hole 521b is formed.

The air bag system including the diffuser 521 as shown in FIGS. 17A and 17B may be installed in the vehicle as shown in FIG. 18. More particularly, the diffuser 521 may be oriented in the vehicle such that the opposite flat surfaces of the diffuser 521 extend substantially in the vertical direction of the vehicle. In this case, the diffuser 521 is disposed along and adjacent to the roof side rail 31. Thus, the diffuser 521 can be favorably used in the head-protection air bag system.

Furthermore, in the embodiment as shown in FIG. 18, the gas feed holes 521a, 521b are formed in a portion of the flat portion of the diffuser 521 which faces the interior of the passenger compartment, and the air bag body 11 is stored in a folded state on the side of the gas feed holes 521a, 521b closer to the interior of the passenger compartment. With this arrangement, the overall size of the diffuser 521 and the air bag body 11 can be reduced, assuring improved space efficiency, and the path of gas flowing into the air bag can be shortened, resulting in enhanced deployment performance of the air bag.

Figure 19:
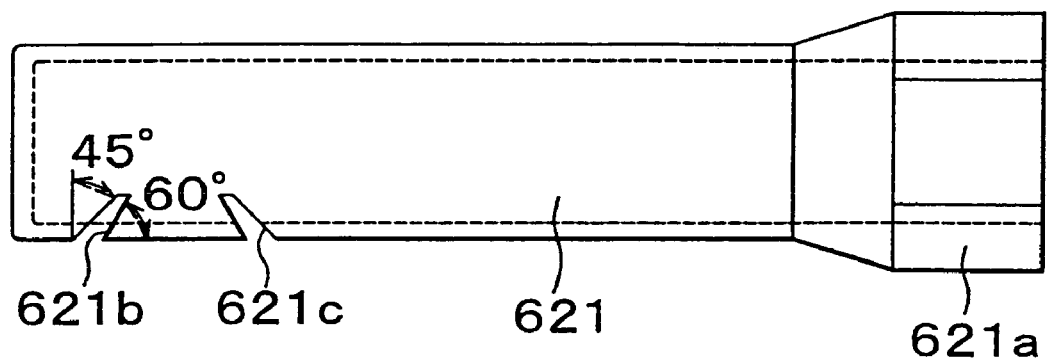
FIG. 19 is a side view showing a twelfth modified example of the diffuser as shown in FIGS. 5 and 6.
Figure 20:
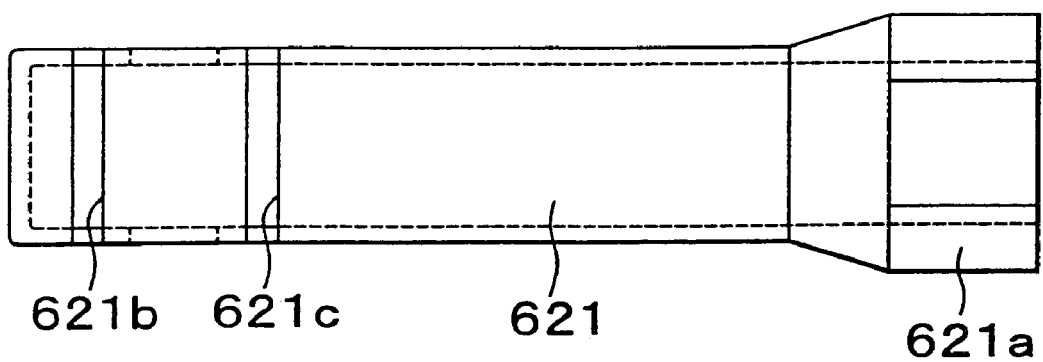
FIG. 20 is a bottom view showing the diffuser as shown in FIG. 19.

Also, while the diffuser 21 has a substantially cylindrical shape in the embodiment of FIG. 1 to 6, the diffuser may have another shape. FIG. 19 and FIG. 20 shows another modified example in which a portion of a diffuser 621 having gas feed holes 621b, 621c may be formed into a rod-like, hollow shape having a rectangular or square cross section. The diffuser 621 also includes a female screw or internally threaded portion 621a having the same shape as the female screw portion 21a of the embodiment of FIG. 1 to FIG. 6. In this example as shown in FIGS. 19 and 20, the gas feed holes 621b, 621c are formed in the shape of slits, and are tapered in the direction from its opening end toward the inside bore of the diffuser 621. With this arrangement, gas is effectively diffused and supplied into the air bag after passing through the slit-like holes 621b, 621c.

While the invention is applied to head-protection air bag systems for use in passenger vehicles in the illustrated embodiments, the invention may be equally applied to head-protection air bag systems for other types of vehicles than passenger vehicles. The invention may also be applied to various types of air bag systems in which an air bag, which is stored in a folded state in a certain portion of the vehicle, is adapted to deploy by using a gas supplied from an inflator via a diffuser so as to protect the driver and passenger(s). For example, the invention may be applied to an air bag system for a passenger seat to be installed in an instrument panel, an air bag system to be mounted in a certain portion of a seat, or the like.

While the invention has been described with reference to exemplary embodiments thereof, it is to be understood that the invention is not limited to the exemplary embodiments or examples. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An air bag system comprising: an air bag which is inflatable in the shape of a curtain stored in a folded state in a vehicle, the air bag comprising a front-seat inflatable portion and a rear-seat inflatable portion which are arranged in a longitudinal direction of the vehicle, said front-seat inflatable portion and rear-seat inflatable portion being connected by a gas passage; an inflator which supplies a gas into the air bag so that the air bag is inflated to protect an occupant of the vehicle; and a diffuser through which the gas is supplied from the inflator into the air bag, wherein the diffuser is only provided in a generally middle portion of the air bag with respect to the longitudinal direction, wherein the diffuser is disposed on only one side of the inflator such that the diffuser and the inflator are substantially aligned with each other; the diffuser open only to the inflator at one distal end thereof, and is closed at another distal end thereof, which is opposite to the one distal end, the diffuser includes a gas feed portion that is provided between the one distal end and other distal end of the diffuser, and that is exposed to a gas inlet formed in a generally middle portion of the air bag with respect to the longitudinal direction, the gas feed portion is formed in a lower surrounding wall of the diffuser that extends in a longitudinal direction thereof, the diffuser supplies gas to the gas passage through the gas feed portion; and a length of the diffuser in the longitudinal direction is smaller than a length of the gas passage in the longitudinal direction.

2. The air bag system according to claim 1, wherein the inflator and the diffuser are arranged along a substantially straight line that extends in the longitudinal direction that is stored in the folded state.

3. The air bag system according to claim 1, wherein the diffuser is disposed substantially concentrically with the inflator.

4. The air bag system according to claim 1, wherein the diffuser has a generally cylindrical shape closed at one end thereof, having substantially the same axis as that of the inflator.

5. The air bag system according to claim 1, wherein the gas feed portion of the diffuser is concentrated in a distal end portion of the diffuser remote from the inflator.

6. The air bag system according to claim 1, wherein the gas feed portion of the diffuser comprises at least one gas feed hole.

7. The air bag system according to claim 6, wherein the gas feed portion of the diffuser comprises a plurality of gas feed holes that are arranged in the longitudinal direction of the diffuser.

8. The air bag system according to claim 7, wherein the plurality of the gas feed holes have respective opening areas that change progressively in the longitudinal direction of the diffuser.

9. The air bag system according to claim 6, wherein the at least one gas feed hole comprises an oblong gas feed hole that extends in the longitudinal direction of the diffuser.

10. The air bag system according to claim 9, wherein the oblong gas feed hole includes a longitudinally end portion having a greater width than a remaining portion thereof.

11. The air bag system according to claim 1, wherein a gas flow control portion that protrudes into the diffuser is provided in the surrounding wall of the diffuser extending in the longitudinal direction.

12. The air bag system according to claim 11, wherein the gas flow control portion is disposed on one side of the gas feed portion that is closer to the inflator.

13. The air bag system according to claim 11, wherein the gas flow control portion and the gas feed portion are formed at the same location in the diffuser.

14. The air bag system according to claim 11, wherein the gas feed portion is opposed to the gas flow control portion in a direction perpendicular to the longitudinal direction of the diffuser.

15. The air bag system according to claim 14, wherein the gas flow control portion is formed in a wedge-like shape, and includes a first inclined surface that faces the inflator and a second inclined surface that faces a distal end portion of the diffuser.

16. The air bag system according to claim 6, wherein each of the at least one gas feed hole is tapered such that a longitudinal dimension of the gas feed hole increases in a direction from an inside of the diffuser toward an outside thereof.

17. The air bag system according to claim 6, wherein the diffuser includes a distal end portion having an inclined face adapted to reflect a gas ejected substantially straight from the inflator toward the at least one gas feed hole.

18. The air bag system according to claim 6, wherein the diffuser includes a generally flat portion having opposite flat surfaces in which the at least one gas feed hole is formed.

19. The air bag system according to claim 18, wherein the diffuser is mounted in the vehicle such that the opposite flat surfaces of the diffuser extend substantially in a vertical direction of the vehicle.

20. The air bag system according to claim 19, wherein the at least one gas feed hole is formed in one of the opposite flat faces of the diffuser that faces an interior of a vehicle compartment, and the air bag is stored in the folded state on one side of the at least one gas feed hole closer to the interior of the vehicle compartment.

21. The air bag system according to claim 6, wherein the position of the at least one gas feed hole is determined such that gas flow through the at least one gas feed hole does not interfere with a portion of the air bag that defines the gas inlet.

22. The air bag system according to claim 6, wherein the position of the at least one gas feed hole is determined such that a centerline of flow of a gas from the diffuser into the air bag lies on an inner side of a vehicle compartment relative to an upper end of a pillar garnish.

23. The air bag system according to claim 6, wherein the diffuser includes a hollow, rod-like portion having a rectangular cross section, and the at least one gas feed hole comprises at least one slit formed in the hollow, rod-like portion of the diffuser, the at least one slit being tapered toward an inner bore of the diffuser.

24. The air bag system according to claim 7, wherein the diffuser includes front and rear gas feed holes.

25. The airbag system according to claim 24, wherein an opening area of the front gas feed hole is greater than an opening area of the rear gas feed hole.

26. The air bag system according to claim 24, wherein said front seat inflatable portion and said rear seat inflatable portion inflate substantially simultaneously.

* * * * *

UNITED STATES PATENT AND TRADEMARK OFFICE
CERTIFICATE OF CORRECTION

| | |
|---|---|
| PATENT NO. | : 7,370,882 B2 |
| APPLICATION NO. | : 10/484496 |
| DATED | : May 13, 2008 |
| INVENTOR(S) | : Shinya Tokunaga et al. |

Page 1 of 1

It is certified that error appears in the above-identified patent and that said Letters Patent is hereby corrected as shown below:

Claim 1, col. 9, line 65, "the diffuser open" should read --the diffuser is open--.

Signed and Sealed this

Seventh Day of October, 2008

JON W. DUDAS
*Director of the United States Patent and Trademark Office*